US011012682B2

(12) United States Patent
Oberascher et al.

(10) Patent No.: US 11,012,682 B2
(45) Date of Patent: May 18, 2021

(54) LINEARLY ACTUATED DISPLAY

(71) Applicant: TEXAS INSTRUMENTS INCORPORATED, Dallas, TX (US)

(72) Inventors: Kristofer Scott Oberascher, Princeton, TX (US); Alexander Lyubarsky, Dallas, TX (US); Daniel Jay Morgan, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/288,882

(22) Filed: Feb. 28, 2019

(65) Prior Publication Data

US 2019/0273915 A1 Sep. 5, 2019

Related U.S. Application Data

(60) Provisional application No. 62/637,895, filed on Mar. 2, 2018, provisional application No. 62/661,316, filed on Apr. 23, 2018, provisional application No. 62/786,818, filed on Dec. 31, 2018, provisional application No. 62/786,830, filed on Dec. 31, 2018.

(51) Int. Cl.
| | |
|---|---|
| *H04N 13/383* | (2018.01) |
| *H04N 13/363* | (2018.01) |
| *H04N 13/398* | (2018.01) |
| *H04N 9/31* | (2006.01) |
| *G06T 7/70* | (2017.01) |
| *H04N 13/32* | (2018.01) |
| *H04N 13/38* | (2018.01) |
| *H04N 13/376* | (2018.01) |

(52) U.S. Cl.
CPC ............ *H04N 13/383* (2018.05); *G06T 7/70* (2017.01); *H04N 9/3147* (2013.01); *H04N 13/32* (2018.05); *H04N 13/363* (2018.05); *H04N 13/376* (2018.05); *H04N 13/38* (2018.05); *H04N 13/398* (2018.05); *G06T 2207/30201* (2013.01)

(58) Field of Classification Search
CPC ... H04N 13/363; H04N 13/398; H04N 13/383
USPC ........................................................ 348/51
See application file for complete search history.

(56) References Cited

U.S. PATENT DOCUMENTS 4,411,489 A * 10/1983 McGrew .............. G03H 1/0406
359/23
4,717,949 A 1/1988 Eichenlaub
(Continued)

FOREIGN PATENT DOCUMENTS

WO 2011012913 A1 2/2011

*Primary Examiner* — Zaihan Jiang
(74) *Attorney, Agent, or Firm* — Michelle F. Murray; Charles A. Brill; Frank D. Cimino

(57) ABSTRACT

An apparatus includes an image sensor, a linear actuator, a projector coupled to the linear actuator, and a controller coupled to the image sensor and to the linear actuator. The controller is configured to determine a location of an eye of a user based on image data from the image sensor. The controller is further configured to activate the linear actuator to drive the projector to a position associated with projecting to the eye at the location. The controller is further configured to initiate projection, via the projector, of an image depicting a view of a three-dimensional scene, the image selected based on the location.

15 Claims, 10 Drawing Sheets

(56) References Cited

U.S. PATENT DOCUMENTS

| | | | |
|---|---|---|---|
| 4,829,365 A | 5/1989 | Eichenlaub | |
| 5,349,379 A | 9/1994 | Eichenlaub | |
| 5,500,765 A | 3/1996 | Eichenlaub | |
| 5,959,664 A | 9/1999 | Woodgate | |
| 6,157,424 A | 12/2000 | Eichenlaub | |
| 6,533,420 B1 | 3/2003 | Eichenlaub | |
| 6,590,605 B1 | 7/2003 | Eichenlaub | |
| 8,885,882 B1 * | 11/2014 | Yin | G06K 9/00248 382/103 |
| 2005/0134797 A1 * | 6/2005 | Grove | A61B 3/135 351/214 |
| 2010/0014053 A1 | 1/2010 | Brentnall, III et al. | |
| 2011/0063575 A1 | 3/2011 | Nelson et al. | |
| 2011/0228042 A1 | 9/2011 | Gao et al. | |
| 2012/0162204 A1 * | 6/2012 | Vesely | G06F 3/0325 345/419 |
| 2013/0112650 A1 * | 5/2013 | Karam | B23K 26/211 216/13 |
| 2014/0022362 A1 * | 1/2014 | Oellers | H04N 13/363 348/60 |
| 2014/0118511 A1 | 5/2014 | Hyde et al. | |
| 2014/0139652 A1 | 5/2014 | Aiden et al. | |
| 2016/0057409 A1 | 2/2016 | Kim et al. | |
| 2016/0209647 A1 * | 7/2016 | Fursich | G02B 27/0093 |
| 2017/0287221 A1 * | 10/2017 | Ghaly | G06T 7/70 |
| 2017/0299873 A1 * | 10/2017 | Hickerson | G02B 27/0093 |
| 2018/0217380 A1 * | 8/2018 | Nishimaki | G02B 27/0176 |
| 2019/0129181 A1 * | 5/2019 | Polcak | G02B 27/0955 |
| 2019/0187482 A1 * | 6/2019 | Lanman | G06F 3/011 |
| 2019/0244005 A1 * | 8/2019 | Suzuki | G06K 9/0061 |

\* cited by examiner

LINEARLY ACTUATED DISPLAY

RELATED APPLICATIONS

This application claims priority to U.S. Provisional Application No. 62/637,895, filed Mar. 2, 2018, U.S. Provisional Application No. 62/661,316, filed Apr. 23, 2018, U.S. Provisional Application No. 62/786,818, filed on Dec. 31, 2018, and U.S. Provisional Application No. 62/786,830, filed on Dec. 31, 2018 which are hereby incorporated by reference.

BACKGROUND

Stereoscopic displays present a different image of a scene to each of a user's eyes. This presentation of different images to each of the eyes is known as stereoscopy. The different images correspond to views from slightly different angles to simulate binocular disparity that would occur due to the eyes' horizontal separation (parallax) if the user was observing the scene in the natural world. Accordingly, stereoscopy generates an impression of depth. Stereoscopic displays typically use some type of glasses, whether active or passive, to switch the left and right eye images from the display to the appropriate eyes.

Further, autostereoscopic displays provide left and right eye images without specialized eyewear. This is typically done by creating what is known as a multi-view display. Such displays generate multiple views using any one of a number of techniques that may involve lenticular lenses, lens arrays, parallax barriers, or multiple projectors. In the case of multiple projectors, the number of views created by the display is typically equivalent to the number of projectors. Therefore, if using 10 projectors, the system can be considered a 10-view 3D display. However, 10 views may be insufficient to provide a smooth motion parallax as the user changes position relative to the display.

If the autostereoscopic display is to have a wide viewing angle, there must be enough views generated to provide a high angular resolution of the image. For example, in a display with a 30 degree viewing angle and 10 views, the angular resolution per view is 3 degrees. This means as the user moves relative to the screen, the image on the display may appear to have "judder" since the images from one view to the next will have a large change in perspective angle. More views (and corresponding projectors) may be introduced to increase angular resolution to eliminate the "judder." Super multiview displays provide the smoothest motion parallax effect and simulate a true light field display. These displays provide multiple views into each of the user's eyes to achieve angular resolution on the order of approximately 0.1". However, such displays may require greater than 100 projectors to provide such fine angular resolution and smooth parallax.

SUMMARY

Disclosed are systems and methods for increasing angular resolution in an autostereoscopic display based on user eye detection. In particular, the disclosed systems and methods may increase angular resolution without adding additional projectors. Further, the disclosed systems and methods may project fewer views at a time as compared to systems that simultaneously project views from each of a large array of projectors. Thus, the disclosed systems and methods may have reduced rendering complexity. Accordingly, cost and size/weight of a display may be reduced both because fewer projectors may be used and also because fewer or less expensive graphics processing units may be used.

In some examples, a display includes an array of projectors, a camera, and a controller. The array of projectors is arranged in a linear fashion or grid fashion. For example, the array of projectors may be arranged horizontally. The projectors are configured to project to viewing windows in space that are sized and spaced such that a user's eyes are located in different viewing windows. The camera captures images of the user's eyes and, based on the images, the controller determines locations of the user's eyes within viewing windows associated with projectors of the array. The controller achieves stereoscopy by causing different images of a scene to be projected to the different windows in which the user's eyes are located. Further, the controller selects the images based on locations of the user's eyes within the viewing windows. As an eye moves horizontally within a viewing window associated with a projector, the controller changes an image projected by the projector accordingly. Because the controller selects an image projected to a viewing window based on location of an eye within the viewing window, each viewing window of each projector is capable of displaying more than one view. Therefore, the display has an increased horizontal angular resolution without the addition of additional projectors. Accordingly, the display may provide a smooth horizontal motion parallax as the user moves horizontally relative to the display. Further, the controller may create a vertical motion parallax effect by selecting the projected images based further on vertical locations of the user's eyes within the viewing windows. Accordingly, both vertical and horizontal parallax effects may be created by the controller using a row of projectors. In alternative examples, a vertical parallax effect may be generated at least in part by use of a grid of projectors.

An apparatus includes a projector array including a plurality of projectors. Each projector is configured to project to a corresponding viewing window. The apparatus further includes an image sensor and a controller. The controller is configured to determine a first location, within a first viewing window, of a first eye of a user based on image data from the image sensor. The first viewing window corresponds to a first projector of the plurality of projectors. The controller is further configured to determine a second location within a second viewing window of a second eye of the user based on the image data. The second viewing window corresponds to a second projector of the plurality of projectors. The controller is further configured to initiate projection, via the first projector, of a first image depicting a first view of a three-dimensional scene. The first image is selected based on the first location. The controller is further configured to initiate projection, via the second projector, of a second image depicting a second view of the three-dimensional scene. The second image is selected based on the second location.

A method includes determining a first location, within a first viewing window, of a first eye of a user based on image data from an image sensor. The first viewing window corresponds to a first projector of a plurality of projectors. The method further includes determining a second location, within a second viewing window, of a second eye of the user based on the image data. The second viewing window corresponds to a second projector of the plurality of projectors. The method further includes initiating projection, via the first projector, of a first image depicting a first view of a three-dimensional scene. The first image is selected based on the first location. The method further includes initiating projection, via the second projector, of a second image depicting a second view of the three-dimensional scene. The second image is selected based on the second location.

A computer readable storage device stores instructions executable by one or more processors to determine a first location, within a first viewing window, of a first eye of a user based on image data from an image sensor. The first viewing window corresponds to a first projector of a plurality of projectors. The instructions are further executable by the one or more processors to determine a second location, within a second viewing window, of a second eye of the user based on the image data. The second viewing window corresponds to a second projector of the plurality of projectors. The instructions are further executable by the one or more processors to initiate projection, via the first projector, of a first image depicting a first view of a three-dimensional scene. The first image is selected based on the first location. The instructions are further executable by the one or more processors to initiate projection, via the second projector, of a second image depicting a second view of the three-dimensional scene. The second image is selected based on the second location.

In some examples, a display includes a linear actuator, a projector coupled to the linear actuator, a camera, and a controller. The linear actuator is configured to move the projector in a direction (e.g., a horizontal direction). The camera captures images of a user's eyes and, based on the images, the controller determines a location of an eye of the user. Based on the location of the user's eye, the controller activates the linear actuator to move the projector to a position associated with projecting to a portion of a pupil of the eye at the location. The controller further selects an image based on the location and initiates projection of the image via the projector. As the eyes move horizontally, the controller changes the images projected and drives the linear actuator accordingly. Therefore, the display has an increased horizontal angular resolution without the addition of additional projectors. Accordingly, the display may provide a smooth horizontal motion parallax as the user moves horizontally relative to the display. Further, the controller may create a vertical motion parallax effect by selecting the projected images based further on vertical locations of the user's eyes. The viewing windows may be expanded in a vertical direction by a diffuser screen. Accordingly, a user's eyes may move vertically within a viewing window without repositioning of the corresponding projector.

An apparatus includes an image sensor, a linear actuator, a projector coupled to the linear actuator, and a controller coupled to the image sensor and to the linear actuator. The controller is configured to determine a location of an eye of a user based on image data from the image sensor. The controller is further configured to activate the linear actuator to drive the projector to a position associated with projecting to the eye at the location. The controller is further configured to initiate projection, via the projector, of an image depicting a view of a three-dimensional scene, the image selected based on the location.

A method includes receiving image data from an image sensor. The method further includes determining a location of an eye of a user based on the image data. The method further includes activating a linear actuator to drive a projector to a position associated with projecting to the eye at the location. The method further includes initiating projection, via the projector, of an image depicting a view of a three-dimensional scene, the image selected based on the location.

A computer readable storage device stores instructions executable by one or more processors to receive image data from an image sensor. The instructions are further executable by the one or more processors to determine a location of an eye of a user based on the image data. The instructions are further executable by the one or more processors to activate a linear actuator to drive a projector to a position associated with projecting to the eye at the location. The instructions are further executable by the one or more processors to initiate projection, via the projector, of an image depicting a view of a three-dimensional scene, the image selected based on the location.

BRIEF DESCRIPTION OF THE DRAWINGS

For a detailed description of various examples, reference will now be made to the accompanying drawings in which.

DETAILED DESCRIPTION

Figure 1:
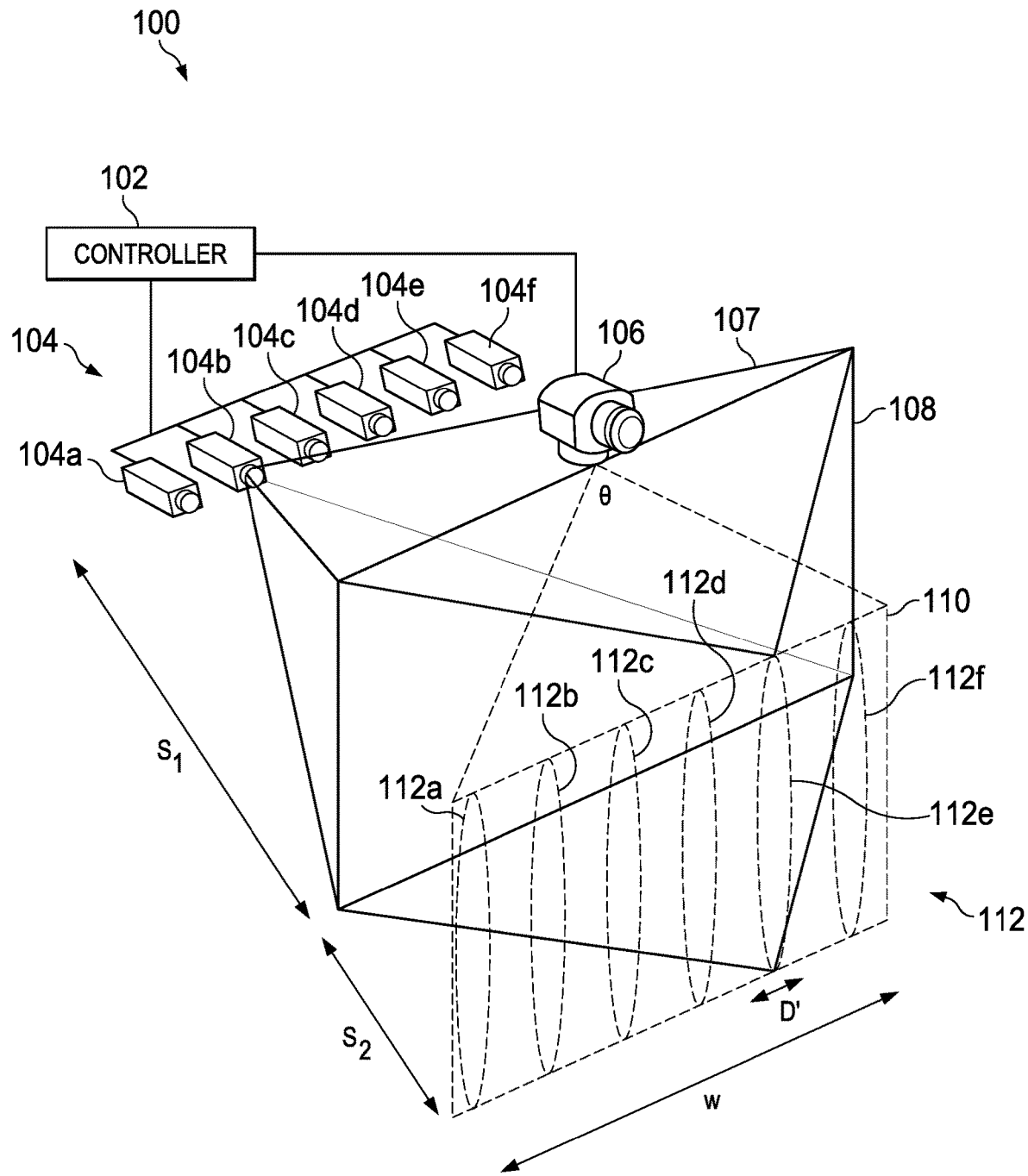
FIG. 1 shows a diagram of a system for increasing angular resolution in an autostereoscopic multiview display based on user eye detection.

Referring to FIG. 1, a diagram of a system 100 for increasing angular resolution in an autostereoscopic multiview display based on user eye detection is shown. The system 100 includes a controller 102, a projector array 104, an image sensor 106, and a screen assembly 108. The system 100 may include more components than illustrated. For example, the system 100 may include one or more speakers, one or more communication interfaces, an optical media drive, etc.

The controller 102 includes one or more processing units. Examples of processing units include central processing units (CPUs), graphics processing units (GPUs), etc. In some implementations the controller 102 includes a GPU for each projector in the projector array 104. While not illustrated, the system 100 may further include one or more computer readable storage devices (e.g., computer memory) storing instructions executable by the controller 102 to perform one or more of the functions described herein. As used herein, a computer readable storage device is an article of manufacture and is not a signal. In some implementations, the controller 102 includes dedicated hardware, such as field programmable gate arrays, configured to perform one or more of the functions described herein. The image sensor 106 may correspond to a camera or other type of imaging device.

In the illustrated example, the projector array 104 includes a first projector 104a, a second projector 104b, a third projector 104c, a fourth projector 104d, a fifth projector 104e, and a sixth projector 104f. Alternative examples include more or fewer projectors. The projectors 104a-104f may correspond to digital light processing (DLP®) projectors (DLP is a registered trademark of Texas Instruments Inc., of Dallas, Tex.), liquid crystal on silicon (LCoS), "3LCD®" projectors (3LCD is a registered trademark of Seiko Espon Kabushiki Kaisha of Tokyo, Japan), or any other types of projectors. The projectors 104a-104f are arranged horizontally although other orientations are possible. The screen assembly 108 may include a diffuser screen, one or more Fresnel lenses, a holographic screen, or a combination thereof. For example, the screen assembly 108 may include a diffuser screen placed between two Fresnel lenses. In another example, the screen assembly includes 108 and no diffuser screen. The screen assembly is configured to direct light from each of the array of projectors 104a-104f to a corresponding one of a plurality of viewing windows 112 within a viewing zone 110. The plurality of viewing windows 112 include a first viewing window 112a, a second viewing window 112b, a third viewing window 112c, a fourth viewing window 112d, a fifth viewing window 112e, and a sixth viewing window 112f. The screen assembly 108 is configured to direct light from the first projector 104a to the sixth viewing window 112f, light from the second projector 104b to the fifth viewing window 112e, light from the third projector 104c to the fourth viewing window 112d, light from the fourth projector 104d to the third viewing window 112c, light from the fifth projector 104e to the second viewing window 112b, and light from the sixth projector 104f to the first viewing window 112a. In the illustrated example, the screen assembly 108 is shown directing light 107 from the second projector 104b to the fifth viewing window 112e. It should be noted that, while the viewing windows 112a-112f are depicted with gaps in-between for ease of illustration, some of the viewing windows 112a-112f overlap each other in many implementations.

In the illustrated example, the projectors 104a-104f are a distance $s_1$ from the diffuser screen, and the viewing zone 110 is a distance $s_2$ from the screen assembly 108 and has a width of w. Each of the viewing windows 112a-112f has a width of D'. D', w, and positions of the viewing windows 112a-112f are based on $s_1$ and $s_2$. A manufacturer of the system 100 may set $s_1$. In some implementations, the image sensor 106 corresponds to a stereo camera and the controller 102 is configured to calculate a distance from the system 100 to the user or the system 100 further includes a separate depth sensor configured to generate depth data indicating a distance from the system 100 to a user. The controller 102 may then calculate $s_2$ based on the depth data and then calculate w, D', and positions of the viewing windows 112a-112f within the viewing zone 110 based on $s_2$. In other implementations, $s_2$, w, D', the positions of the viewing windows 112a-112f, or a combination thereof are hardcoded.

In operation, the image sensor 106 generates image data depicting a scene in front of the diffuser screen 108. While a user is using the system 100, the image data depicts the user. The controller 102 receives the image data from the image sensor 106 and identifies a location of a first eye of the user within one of the viewing windows 112a-112f. The controller 102 identifies a first location of a first eye (e.g., a left eye) of the user within one of the viewing windows 112a-112f and identifies a second location of a second eye (e.g., a right eye) of the user within one of the plurality of viewing windows 112a-112f. The projector array 104 is arranged such that the width D' of each of the plurality of viewing windows 112a-112f prevents the first eye and the second eye from being located in the same viewing window when the user's eyes are substantially horizontally aligned (or otherwise aligned with the projector array 104). The controller 106 selects a first image depicting a first view of a three-dimensional scene based on the first location and initiates projection of the first image via the projector(s) of the projector array 104 corresponding to the viewing window(s) of the plurality of viewing windows 112 that include the first location. Similarly, the controller 106 selects a second image depicting a second view of the three-dimensional scene based on the second location and initiates projection of the second image via the projector(s) of the projector array 104 corresponding to the viewing window(s) of the plurality of viewing windows 112 that include the second location. The first and second views of the three-dimensional scene are from slightly different viewing angles. Accordingly, the user's eyes will each receive different views of the three-dimensional scene creating a stereoscopic effect. Further, because the controller 102 selects the images based on locations of the eyes within the plurality of viewing windows 112, different views may be projected to an eye of the user as the eye moves through a particular one of the plurality of viewing windows 112 as illustrated in FIGS. 2A-2B and FIGS. 3A and 3B. Thus, angular resolution may be increased without the addition of projectors.

Figure 2B:
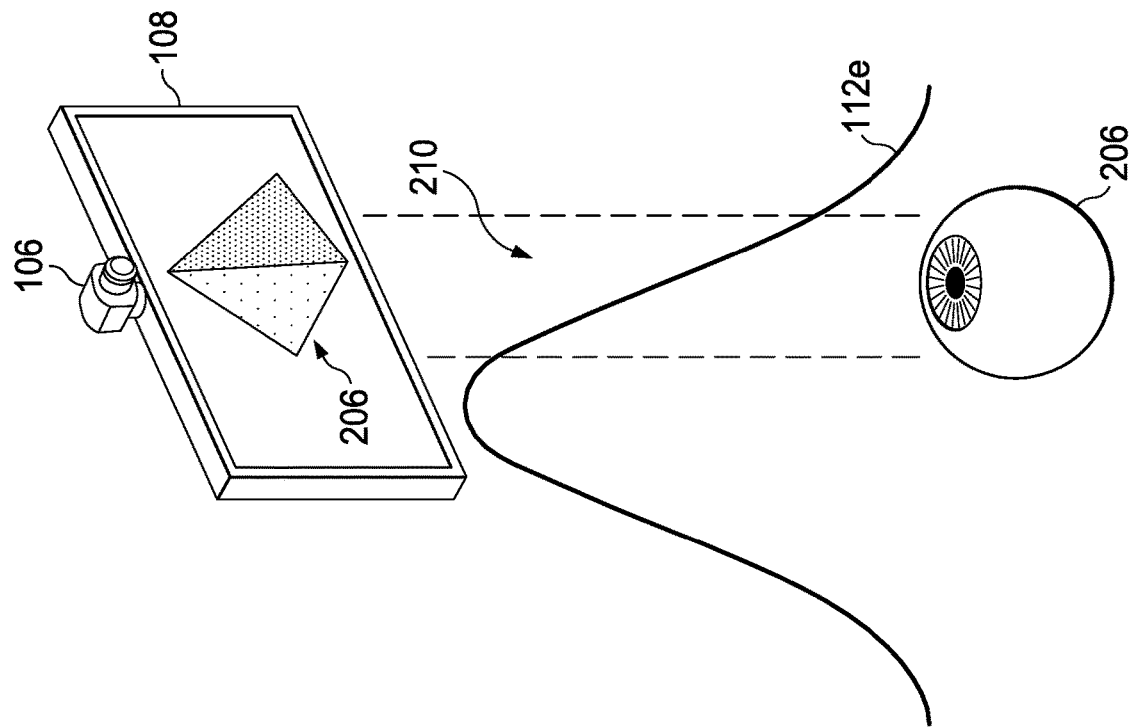
FIG. 2B illustrates the system for increasing angular resolution in an autostereoscopic multiview display projecting a second view of the three-dimensional scene to the eye at a second location after the eye moves horizontally within a viewing window.
Figure 2A:
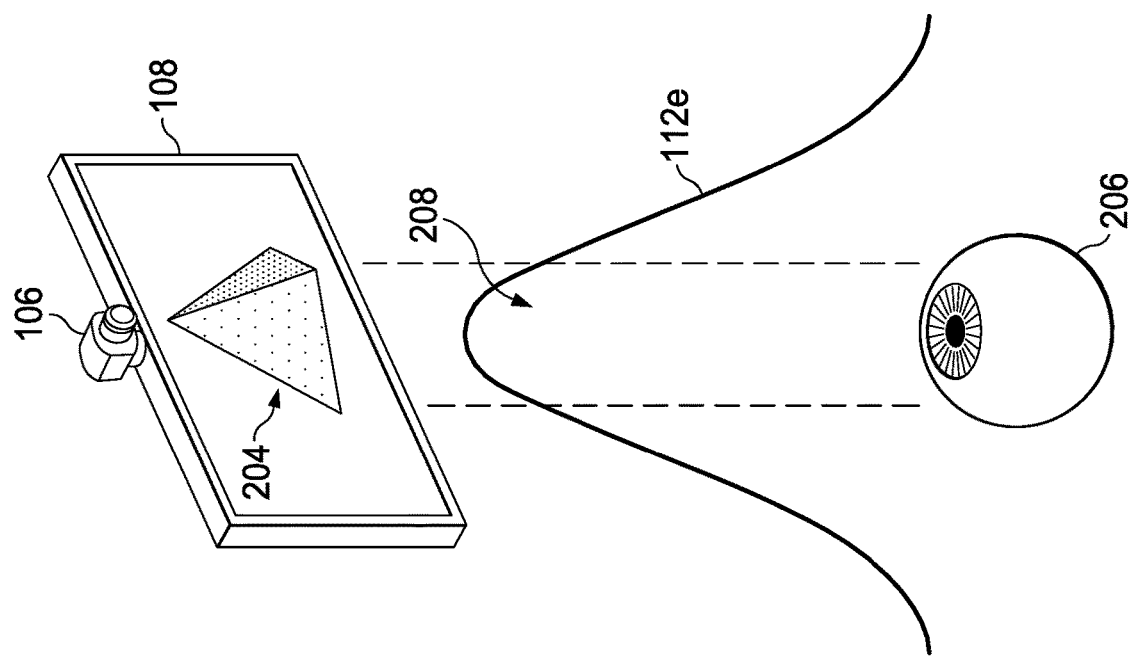
FIG. 2A illustrates the system for increasing angular resolution in an autostereoscopic multiview display projecting a first view of a three-dimensional scene to an eye at a first location.

FIGS. 2A-2B illustrate an example of the system 100 changing images projected by a projector as an eye moves horizontally within a viewing window. In particular, FIGS.

2A-2B show that the controller 102 causes a projector to project different images as an eye 206 of the user moves horizontally through the fifth viewing window 112e. As described above and shown in FIG. 1, the second projector 104b projects to the second viewing window 112e. In the example, shown in FIGS. 2A-2B, the controller 102 determines that the eye 206 is at a first location 208 within the fifth viewing window 112e at a first time based on image data from the camera 106. Based on the first location 208 within the fifth viewing window 112e, the controller 102 initiates projection of a first image 204 via the second projector 104b. The controller 102 then determines that the eye 206 has moved to a second location 210 within the fifth viewing window 112e at a second time based on image data from the camera 106. Based on the second location 210 within the fifth viewing window 112e, the controller 102 initiates projection of a second image 206 via the second projector 104b. The first image 204 and the second image 206 correspond to different views of the same three-dimensional scene. Accordingly, each projector of the system 100 may project more than one view of the three-dimensional scene. Therefore, the system 100 supports an increased number of horizontal views (e.g., horizontal angular resolution) without increasing projector count. Thus, the system 100 creates a relatively smoother horizontal parallax effect as a user moves horizontally through the plurality of viewing windows 112 as compared to another system with an equivalent number of projectors that does not track a user's eyes. It should be noted that in examples in which the projector array 104 is arranged along an axis that is not horizontal, the system 100 increases angular resolution along that axis in the same manner. Further, the system 100 provides additional benefits as described below.

Figure 3A:
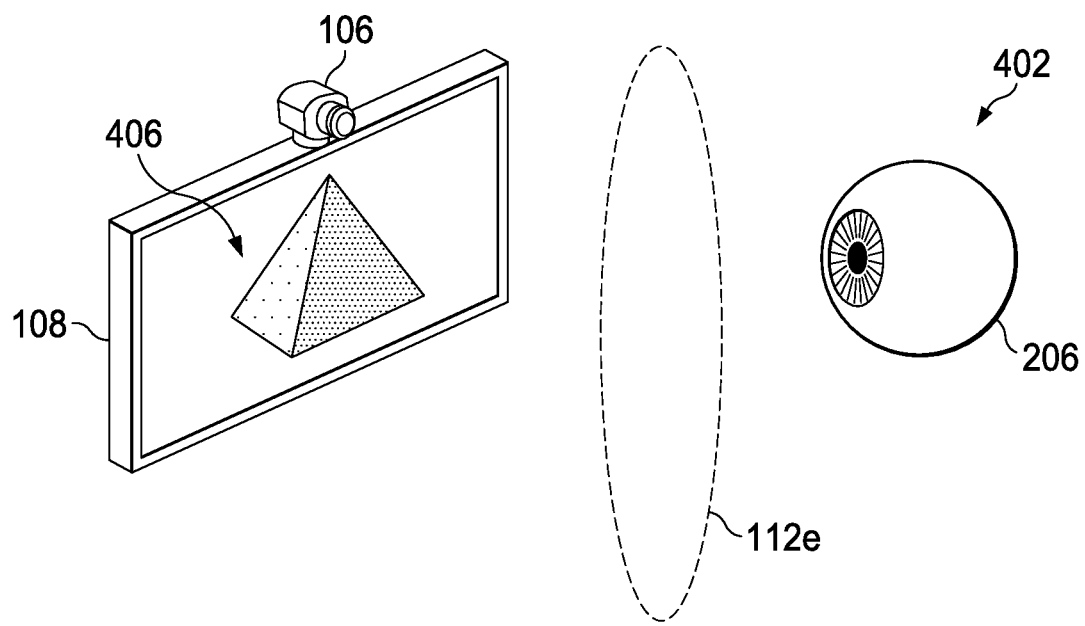
FIG. 3A illustrates the system for increasing angular resolution in an autostereoscopic multiview display projecting a first view of a three-dimensional scene to an eye at a first location.
Figure 3B:
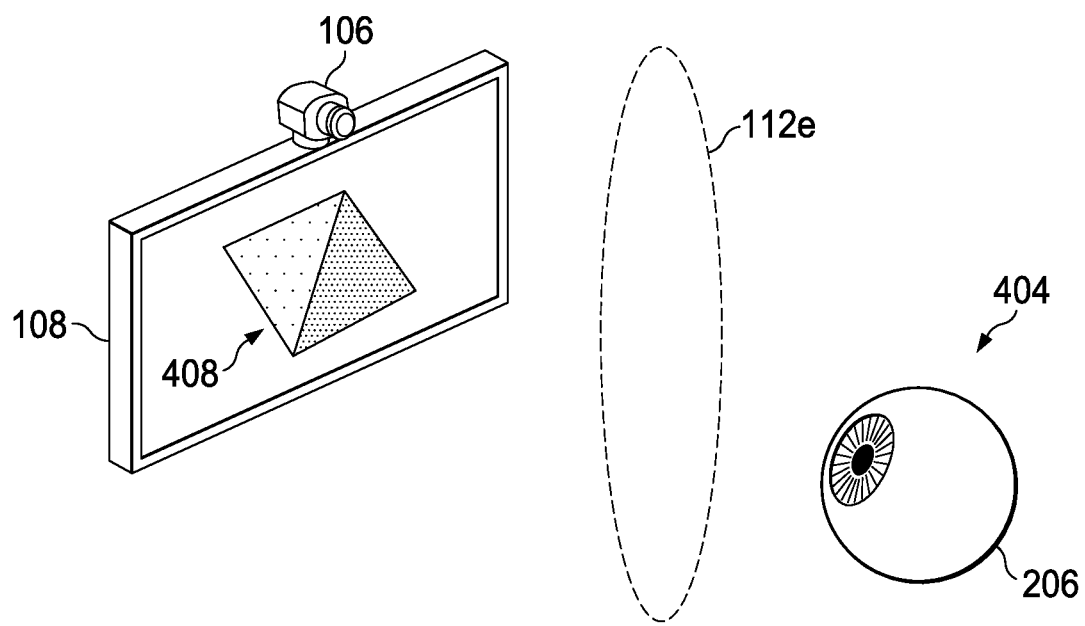
FIG. 3B illustrates the system for increasing angular resolution in an autostereoscopic multiview display projecting a second view of the three-dimensional scene to the eye at a second location after the eye moves vertically within a viewing window.

FIGS. 3A-3B illustrate an example of the system 100 changing images projected by a projector as an eye moves vertically within a viewing window. In particular, FIGS. 3A-3B show that the controller 102 causes a projector to project different images as the eye 206 of the user moves vertically through the fifth viewing window 112e. In the example, shown in FIGS. 3A-3B, the controller 102 determines that the eye 206 is at a first location 402 within the fifth viewing window 112e at a first time based on image data from the camera 106. Based on the first location 402, the controller 102 initiates projection of a first image 406 via the second projector 104b. The controller 102 then determines that the eye 206 has moved to a second location 404 within the fifth viewing window 112e at a second time based on image data from the camera 106. Based on the second location 404, the controller 102 initiates projection of a second image 408 via the second projector 104b. The first image 406 and the second image 408 correspond to different views of the same three-dimensional scene. Accordingly, each projector of the system 100 may project more than one view of the three-dimensional scene in a vertical direction. Therefore, the system 100 supports more than one view in a vertical direction (e.g., vertical angular resolution) without increasing projector count. Thus, the system 100 creates a vertical parallax effect as a user moves vertically through the plurality of viewing windows 112 that may use fewer projectors as compared to systems that deploy a projector per view. Further, the controller 102 may create the horizontal parallax effect and vertical parallax effect simultaneously in situations in which the user's eye moves both horizontally and vertically. It should be noted that in examples in which the projector array 104 is arranged along an axis that is not horizontal, the system 100 increases angular resolution along a second axis that is perpendicular to that axis in the same manner.

Figure 4:
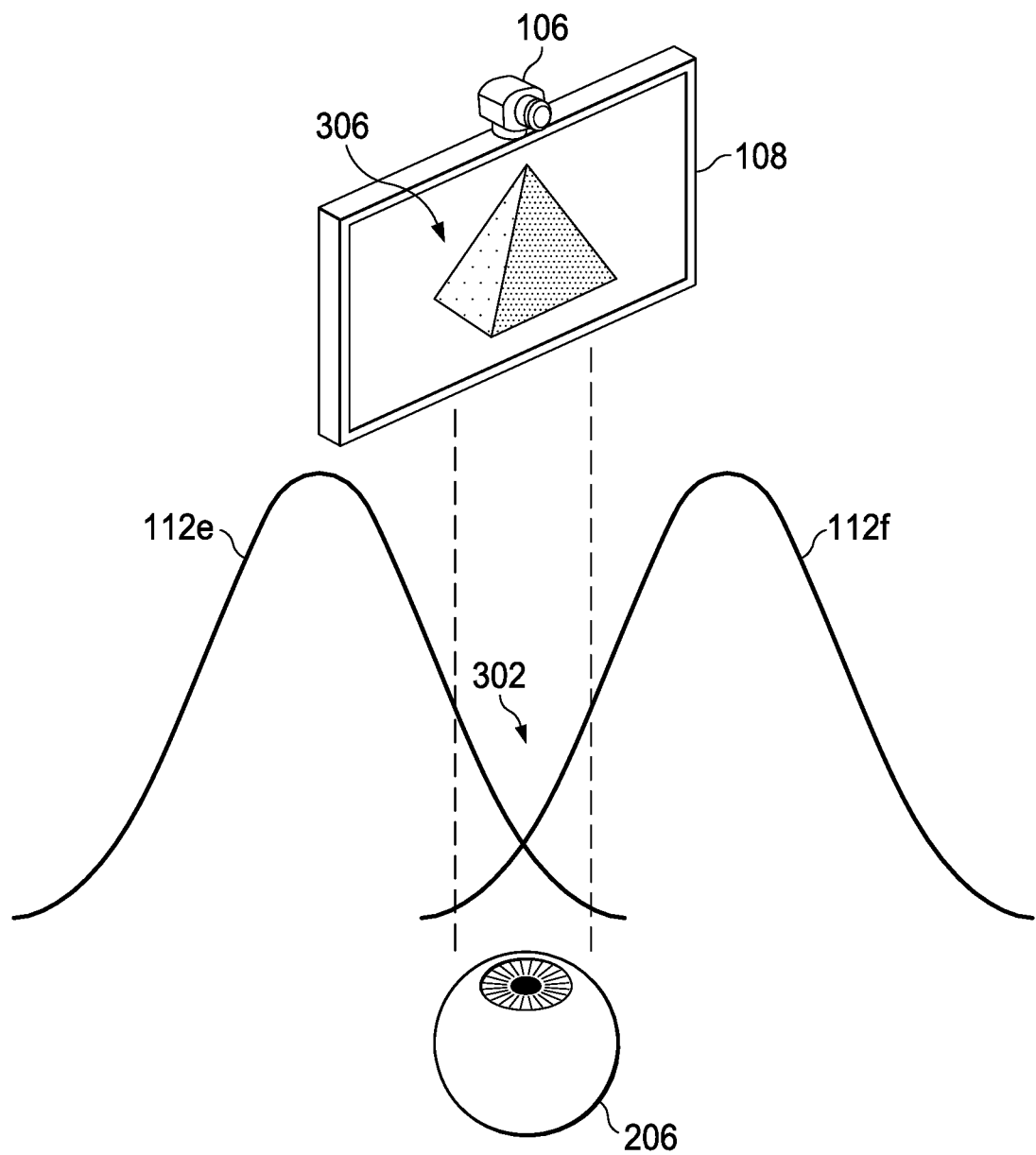
FIG. 4 illustrates the system for increasing angular resolution in an autostereoscopic multiview display causing two projectors to project the same image to the eye in response to the eye being located in viewing windows associated with both of the projectors.

Referring to FIG. 4, a use case in which an eye is simultaneously located in two viewing windows is shown. As explained above, some of the plurality of viewing windows 112 may overlap. Systems in which viewing windows overlap may present continuous views of a scene by avoiding gaps in the viewing windows. However, if an eye receives conflicting images from two projectors, image distortions such as blurring or ghosting may occur. In the illustrated example of FIG. 4, the fifth viewing window 112e and the sixth viewing window 112f overlap and the eye 206 of the user is located at a location 302 that is simultaneously within both. The controller 102 initiates projection of an image 306 via both the first projector 104a and the second projector 104b so that the eye 206 receives the same image 306 from the two projectors 104a, 104b rather than two different images. Accordingly, the system 100 may present clearer views as compared to systems in which each projector projects a different image.

Figure 5A:
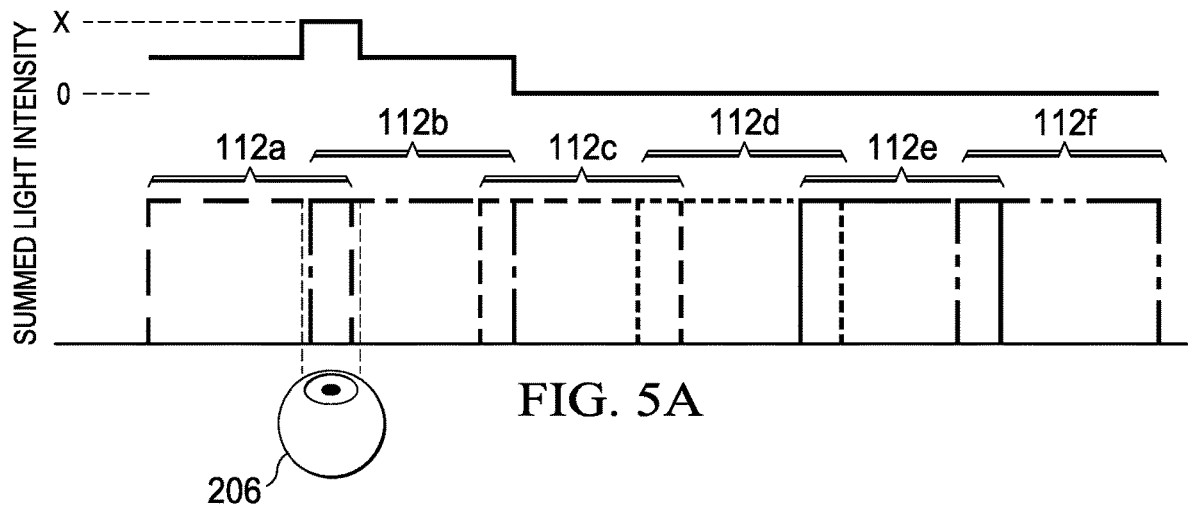
FIG. 5A is a first diagram showing control of summed intensities of light projected to various viewing windows when the eye located in two viewing windows.
Figure 5B:
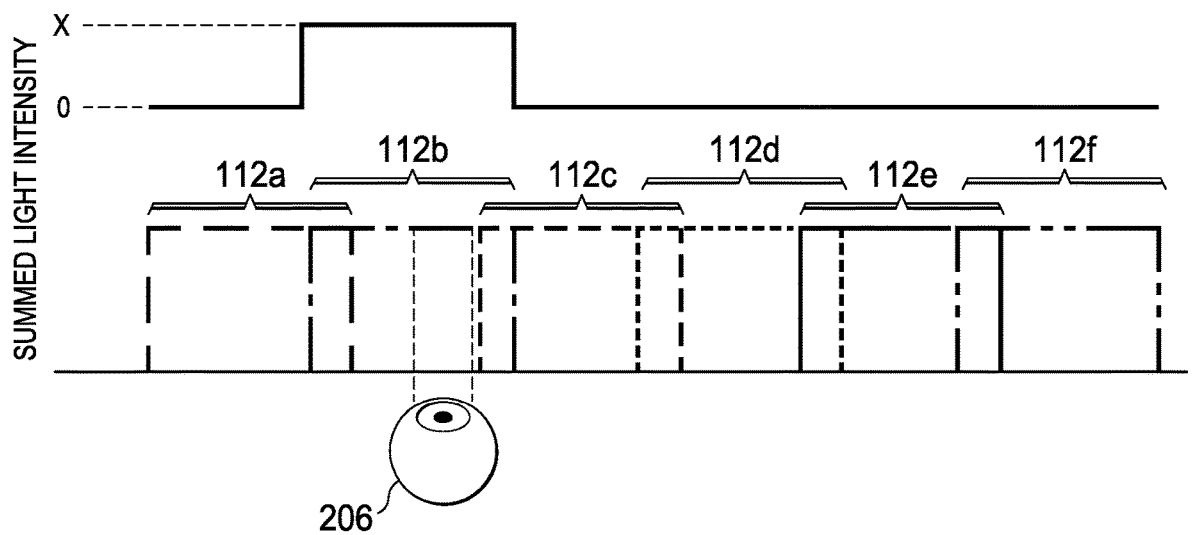
FIG. 5B is a second diagram showing control of summed intensities of light projected to the various viewing windows when the eye located in one of the viewing windows. The first diagram and the second diagram illustrate that an eye experiences consistent light intensity as the eye moves from a region in which viewing windows overlap to a region in which viewing windows do not overlap.

In addition or in the alternative to decreasing blurring effects, the system 100 may manage light intensities projected by the projector array 104 so that a user's eye receives the same (or approximately the same) light intensity as the eye moves from regions within a single one of the plurality of viewing windows 112 to a region within more than one of the plurality of viewing windows 112. Referring to FIGS. 5A and 5B, diagrams illustrating summed light intensities projected to viewing windows are shown. In some examples, the controller 102 is configured to adjust the intensity of light projected by the projector array 104 based on a location of the eye 206 as the eye 206 moves through the viewing zone 110. In the example illustrated in FIGS. 5A and 5B, the controller 102 adjusts the projectors so that the eye 206 experiences a constant intensity of x lumens. FIG. 5A depicts the eye 206 at a location within the first viewing window 112a and the second viewing window 112b. Accordingly, the controller 102 adjusts the fifth projector 104e and the sixth projector 104f to project x/2 lumens to the second viewing window 112b and the first viewing window 112a respectively so that a sum of the intensities received by the eye 206 is x lumens. It should be noted that the intensity distribution of the projector array 104 may be different that shown in FIG. 5A. For example, the distribution may be Gaussian rather than flat or "square." The controller 102 may take into account the intensity distribution of the projector array 104 when calculating a summed intensity of projectors at a point in space. FIG. 5A further depicts that the controller 102 may disable or otherwise cause projectors to stop projecting in response to determining that no eye is located in a corresponding viewing window. This may reduce power consumed by the system 100 and reduce demand on rendering components. Accordingly, the system 100 may utilize simpler (and potentially cheaper) hardware and consume less power as compared to other systems.

FIG. 5B depicts the eye 206 at a location within the second viewing window 112b only. Accordingly, the controller adjusts the fifth projector 104e to project x lumens to the second viewing window 112b so that the eye 206 receives x lumens at this location as well.

Therefore, FIGS. 5A and 5B depict that the system 100 may monitor a position of an eye and adjust one or more projectors so that the eye experiences a constant light intensity as the user moves horizontally across viewing windows. Accordingly, the system 100 may cause decreased eye strain and present more consistent images as compared to other systems. It should be noted that various operations described herein performed by the system 100 with respect to one eye may be performed with respect to both eyes of a user. Thus, while illustrated and described with respect to one eye for ease of explanation, the techniques described in connection with FIGS. 2A, 2B, 3, 4A, 4B, 5A, and 5B may be performed by the system 100 for both eyes of the user.

Figure 6:
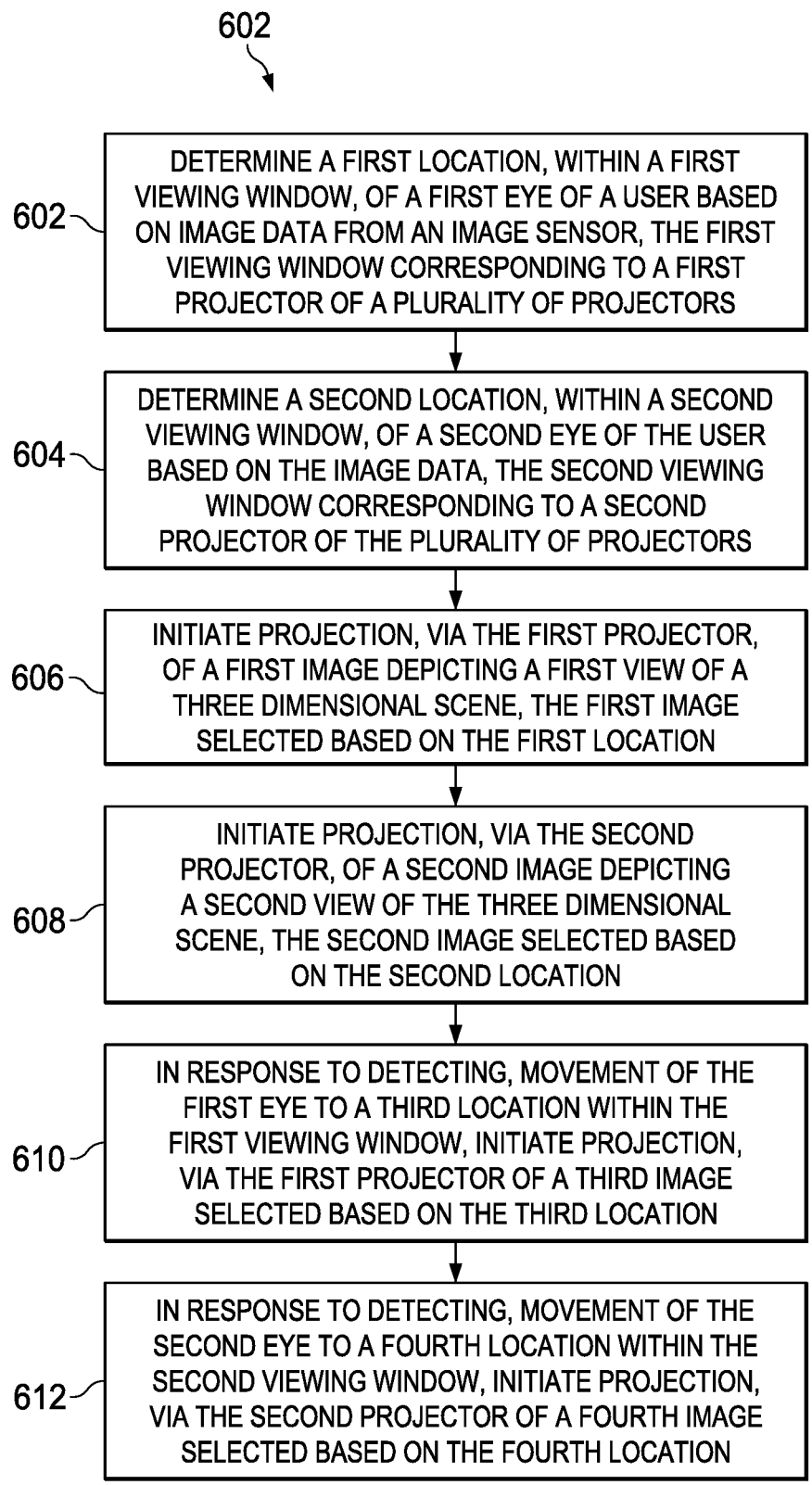
FIG. 6 is a flowchart of a method for increasing angular resolution in an autostereoscopic multiview display.

Referring to FIG. 6, a flowchart illustrating a method 600 for location-based projection to a user's eyes is shown. The method 600 may be performed by the controller 102 of the system 100. The method 600 includes determining a first location, within a first viewing window, of a first eye of a user based on image data from an image sensor, the first viewing window corresponding to a first projector of a plurality of projectors, at 602. For example, the controller 102 may determine that a user's left eye is located at a first particular location within the first viewing window 112a. As explained above, the first viewing window 112a corresponds to the sixth projector 104f.

The method 600 further includes determining a second location, within a second viewing window, of a second eye of the user based on the image data, the second viewing window corresponding to a second projector of the plurality of projectors, at 604. For example, the controller 102 may determine that the user's right eye is located at a second particular location within the fourth viewing window 112d based on the image data. As explained above, the fourth viewing window 112d corresponds to the third projector 104c.

The method 600 further includes initiating projection, via the first projector of a first image depicting a first view of a three-dimensional scene, the first image selected based on the first location, at 606. For example, the controller 102 may select a first image of a three-dimensional scene based on the first particular location of the user's left eye in the first viewing window 112a and initiate projection of the first image from the sixth projector 104f.

The method 600 further includes initiating projection, via the second projector, of a second image depicting a second view of the three-dimensional scene, the second image selected based on the second location, at 608. For example, the controller 102 may select a second image of the three-dimensional scene based on the second particular location of the user's right eye in the fourth viewing window 112d and initiate projection of the second image from the third projector 104c.

The method 600 further includes, in response to detecting movement of the first eye to a third location within the first viewing window, initiating projection, via the first projector, of a third image selected based on the third location, at 610. For example, the controller 102 may detect that that the user's left eye is located at a new particular location within the first viewing window 112a based on image data from the image sensor 106. Accordingly, the controller 102 may select a new image for projection by the sixth projector 104f based on the new location within the first viewing window 112a. This may induce a horizontal parallax effect, a vertical parallax effect or both without the eye moving to a viewing window associated with a different projector.

The method 600 further includes, in response to detecting movement of the second eye to a fourth location within the second viewing window, initiating projection, via the second projector, of a fourth image selected based on the fourth location, at 612. For example, the controller 102 may detect that that the user's right eye is located at a new particular location within the fourth viewing window 112d based on image data from the image sensor 106. Accordingly, the controller 102 may select a new image for projection by the third projector 104c based on the new location within the fourth viewing window 112d. This may induce a horizontal parallax effect, a vertical parallax effect or both without the eye moving to a viewing window associated with a different projector.

Because the images are selected based on the locations of the eyes, the method 600 may provide increased angular resolution and/or decreased projector count as compared to systems that project a designated view per projector.

Figure 7:
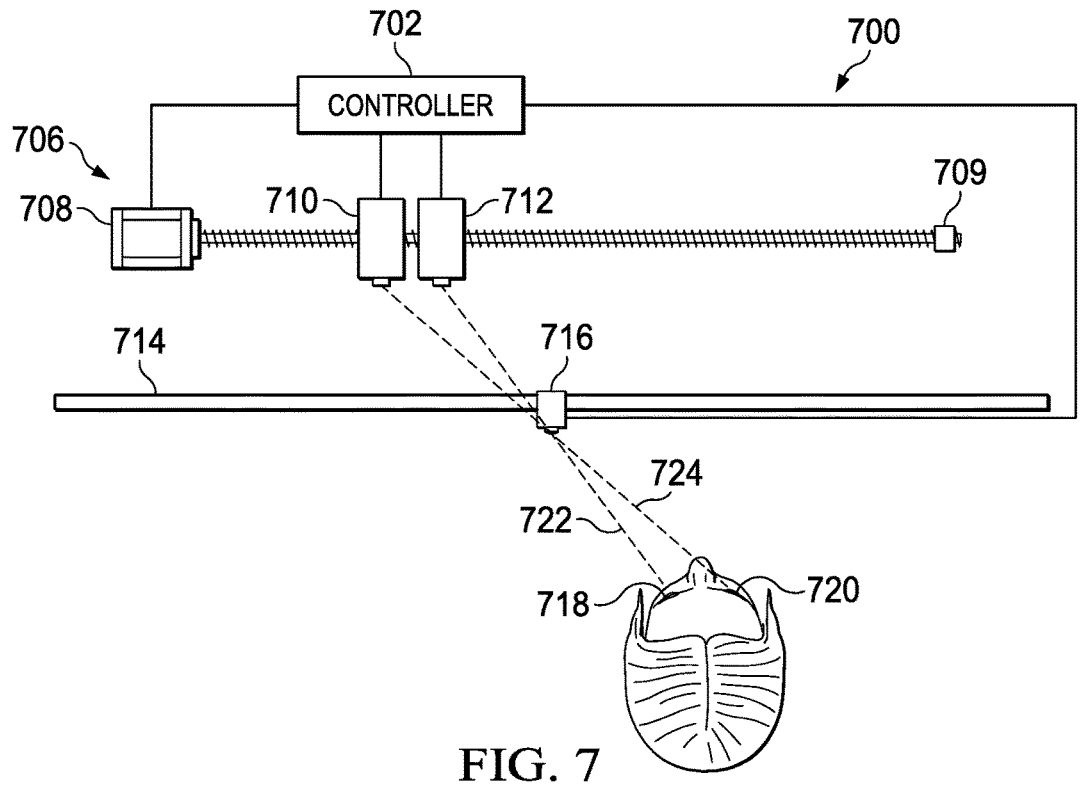
FIG. 7 illustrates an additional system for increasing angular resolution in an autostereoscopic multiview display that includes actuators to move projectors.

Referring to FIG. 7, a diagram of another system 700 for increasing angular resolution in an autostereoscopic multi-view display based on user eye detection is shown. The system 700 includes a controller 702, a linear actuator 706, a first projector 710, a second projector 712, a screen assembly 714, and an image sensor 716. Some examples of the system 700 include more components, such as one or more speakers, a depth sensor, a housing, one or more communication interfaces, additional projectors, etc. The screen assembly 714 may include a diffuser screen, one or more Fresnel lenses, a holographic optical element screen, or a combination thereof.

The controller 702 includes one or more processing units. In some implementations the controller 102 includes a GPU for each projector in the projectors 710, 712. While not illustrated, the system 700 further includes one or more computer readable storage devices (e.g., computer memory) storing instructions executable by the controller 702 to perform one or more of the functions described herein. As used herein, a computer readable storage device is an article of manufacture and is not a signal. In some implementations, the controller 102 includes dedicated hardware, such as field programmable gate arrays, configured to perform one or more of the functions described herein. The image sensor 716 may correspond to a camera or other type of imaging device.

In the example of FIG. 7, the linear actuator 706 includes a motor 708 and a screw 709 though the linear actuator 706 may be replaced with other types of linear actuators. The projectors 710, 712 are arranged on an axis and attached to the linear actuator 708. In some examples, the axis is horizontal. The linear actuator 706 is configured to move the projectors 710, 712 along the axis responsive to commands from the controller 702. The projectors 710, 712 project images to the screen assembly 714. The screen assembly 714 is configured to focus light received from the projectors to particular areas. In particular, the screen assembly 714 directs light from each projector to an area approximately as wide as a human pupil and diffuses light from the projectors 710, 712 in a vertical direction so that viewing windows that receive images from the projectors 710, 712 are expanded in a vertical direction. Due to the width and location of the images as output by the screen assembly 714, each of a first eye 718 and a second eye 720 of a user may receive an image from a different one of the projectors 710, 712. Therefore, the system 700 may present a different view of a three-dimensional scene to each of the eyes 718, 720.

In operation, the controller 702 determines a location of the first eye 718 based on image data from the image sensor 716 and activates the linear actuator 706 to drive one of the projectors 710, 712 to a position associated with projecting the first eye 718. As the user moves parallel to the axis of the linear actuator, the controller 702 identifies updated locations of the first eye 718 and activates the linear actuator 706 to drive one of the projectors 710, 712 to positions associated with projecting to the updated locations. Aligning the first eye 718 with one of the projectors 710, 712 may result in aligning the second eye 720 with the other one of the projectors 710, 712. In some implementations, the system 700 further includes an additional actuator configured to adjust a spacing between the projectors 710, 712 along the linear actuator 706 based on a detected interpupillary distance of a user. For example, the controller 702 may detect the interpupillary distance of the user during a calibration phase based on image data from the image sensor 716. While the first eye 718 is illustrated as a left eye, the controller 702 may drive the actuator based on a location of a right eye of the user. Alternatively, the controller 702 may activate the actuator to drive the projectors 710, 712 based on locations of both the left eye and the right eye. Thus, the projectors 710, 712 are moved by the controller 702 so that one of the projectors 710, 712 projects to one of the eyes 718, 720 while the other projector 710, 712 projects to the other eye 718, 720. Accordingly, the eyes 718, 720 may receive images corresponding to different views of a three-dimensional scene and a stereoscopic effect may be achieved.

Further, the controller 702 selects images of the three-dimensional scene to project based on the locations of the eyes 718, 720. For example, as the first eye 718 moves horizontally the controller 702 may cause the second projector 712 to project images corresponding to views of the three-dimensional scene from different perspectives that vary horizontally. Further, as the first eye 718 moves vertically the controller 702 may cause the second projector 712 to project images corresponding to views of the three-dimensional scene from different perspectives that vary vertically. Accordingly, both a horizontal parallax effect and a vertical parallax effect may be achieved by the system 700. In the illustrated example, the first camera 710 projects a first image 722 to the second eye 720 while the second camera 712 projects a second image 724 to the first eye 718. The first image 722 corresponds to a first view of the three-dimensional scene and the second image 724 corresponds to a second view of the three-dimensional scene from a slightly different perspective. As explained above, the controller 702 selects the images 722, 724 based on locations of the eyes 718, 720 as determined based on image data from the image sensor 702.

Therefore, the system 700 corresponds to an autostereoscopic display that supports both vertical and horizontal parallax effects and uses fewer projectors per eye (e.g., 1) as compared to systems that rely on an array of fixed projectors to produce a stereoscopic effect display with motion parallax.

Human eyes focus on objects through processes called accommodation and vergence. Human eyes include a lens and accommodation refers to the eye adjusting optical power of the eye to focus on a point by altering the shape of the lens. Accommodation to a point results in rays of light from the point converging on the back of an eye. Vergence refers to the movement of both eyes to point to a common point. Vergence and accommodation are typically tied together through the accommodation reflex. Accordingly, human eyes typically accommodate and converge to a common point. However, accommodation and vergence can be uncoupled. For example, in a stereoscopic display system, a user's eyes are presented with different slightly varying images to produce a three-dimensional effect. However, when the user focuses on an object displayed by the stereoscopic display system, the user's eyes converge to a point associated with the object on a display screen while attempting to accommodate to a point in space where the object appears to be and vice versa. Accordingly, rays of light associated with the point that the user's eyes converge to may not converge on the back of the user's eyes. This uncoupling of accommodation and vergence is called vergence accommodation conflict and may cause discomfort in some users of stereoscopic displays. However, providing more than one distinct view (e.g., 3 or more views) of the three-dimensional scene to each eye that reach the eye at specific angles may reduce or resolve the vergence accommodation conflict by causing the users eyes to converge and accommodate to a common point. Thus, an autostereoscopic display system that controls angles at which a user's eyes receive different images of a scene may reduce or resolve the vergence accommodation conflict. In particular, providing multiple images to a user's eyes at specific angles may cause the user's eyes to accommodate to infinity. Accordingly, no matter at what point in space the user's eyes verge to, the point is in focus.

Figure 8A:
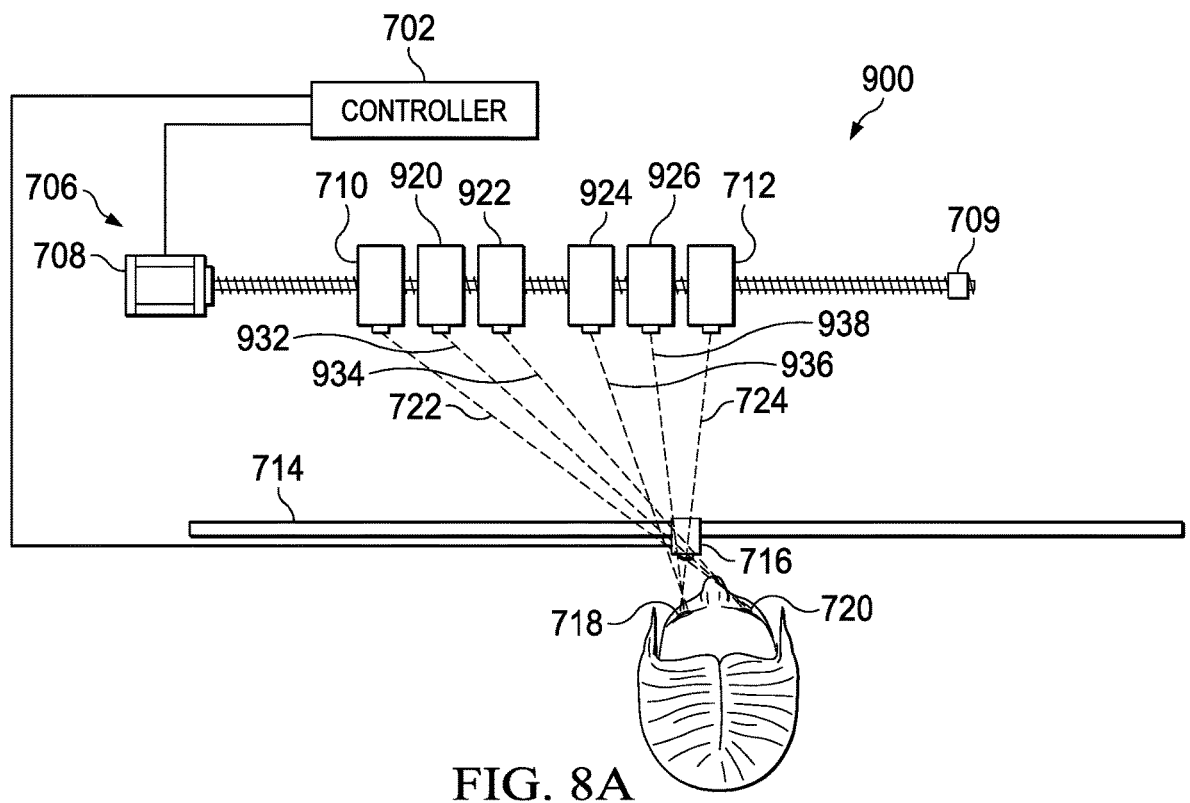
FIG. 8A illustrates an example of the additional system that further includes three projectors per eye.

Referring to FIG. 8A, an example 900 of the system 700 configured to compensate for the vergence accommodation conflict using more than one projector per eye is shown. In addition to the first projector 710 and the second projector 712, the example 900 includes a third projector 920, a fourth projector 922, a fifth projector 924, and a sixth projector 926. The controller 702 is configured to activate the linear actuator 706 to drive the second projector 712 to a first position associated with projecting to a first portion of a pupil of the first eye 718 at the location of the first eye 718, to drive the sixth projector 926 to a second position associated with projecting to a second portion of the pupil of the first eye 718 at the location of the first eye 718, and to drive the fifth projector 924 to a third position associated with projecting to a third portion of the pupil of the first eye 720 at the location of the first eye 718. Similarly, the linear actuator 708 drives the first projector 710 to fourth position associated with projecting to a first portion of the second eye 720 at a location of the second eye 720, drives the third projector 920 to a fifth position associated with projecting to a second portion of the second eye 720 at the location of the second eye 720, and drives the fourth projector 922 to a sixth position associated with projecting to a third portion of the second eye 720. As illustrated, the second projector 712 projects the second image 724 to the first portion of the pupil of the first eye 718, the sixth projector 926 projects a third image 938 to the second portion of the pupil of the first eye 718, and the fifth projector 924 projects a fourth image 936 to the third portion of the pupil of the first eye 718. Similarly, the first projector 710 projects the first image 722 to the first portion of the pupil of the second eye 720, the third projector 920 projects a fifth image 932 to the second portion of the pupil of the second eye 720, and the fourth projector 922 projects a sixth image 934 to the third portion of the pupil of the second eye 720. The controller 702 selects the images 722, 724, 932, 934, 936, 938 based on the locations of the eyes 718, 720. Differences between the images 724, 936, 938 received by the first eye 718 and the images 722, 932, 934 received by the second eye 720 may reduce the vergence accommodation conflict.

Figure 8B:
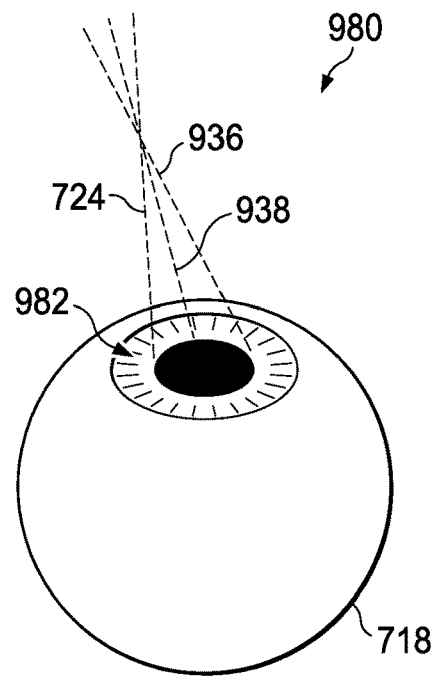
FIG. 8B illustrates an eye receiving three different images depicting different views of a three-dimensional scene simultaneously.

FIG. 8B illustrates a close up view of an eye receiving three distinct images. In particular FIG. 8B shows a first portion of a pupil 982 of the first eye 718 receiving the second image 724, a second portion of the pupil 982 receiving the third image 938, and a third portion of the pupil 982 receiving the fourth image 936. Each of the images as received at the pupil 982 may have a width of between 0.67 millimeters and 2.67 millimeters to accommodate human eye pupils that range between 2-8 mm in width. In some examples, the width is 1.3 millimeters (e.g., ⅓ of the width of an average human eye pupil of 4 mm).

Figure 9:
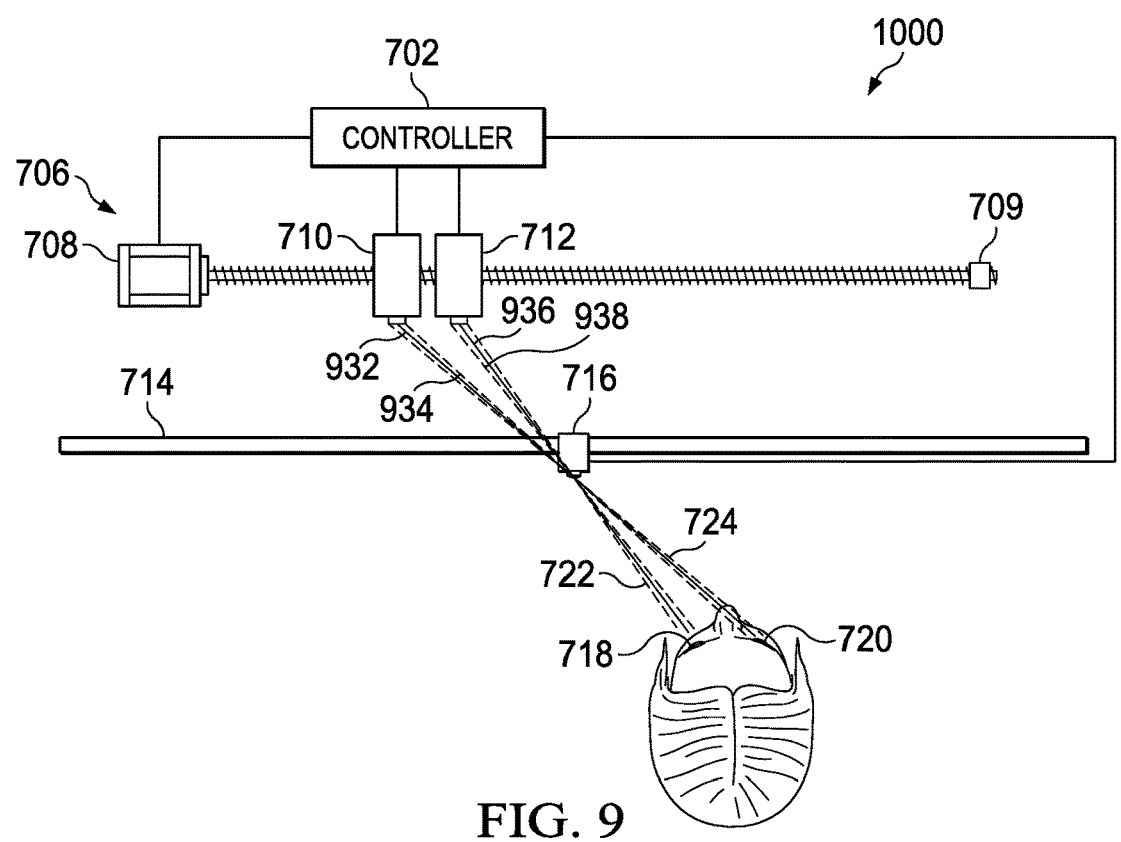
FIG. 9 illustrates an example of the additional system in which a single projector simultaneously projects three views to each eye.

Referring to FIG. 9, an example 1000 of the system 700 configured to compensate for the vergence accommodation conflict using one projector per eye is shown. As illustrated in FIG. 9, the first projector 710 may project each of the first image 722, the third image 932, and the fourth image 934 and the second projector 712 may project each of the second image 724, the fifth image 936, and the sixth image 938. Thus, the system 700 may solve the vergence accommodation conflict using one projector per eye or multiple projectors per eye.

Figure 10:
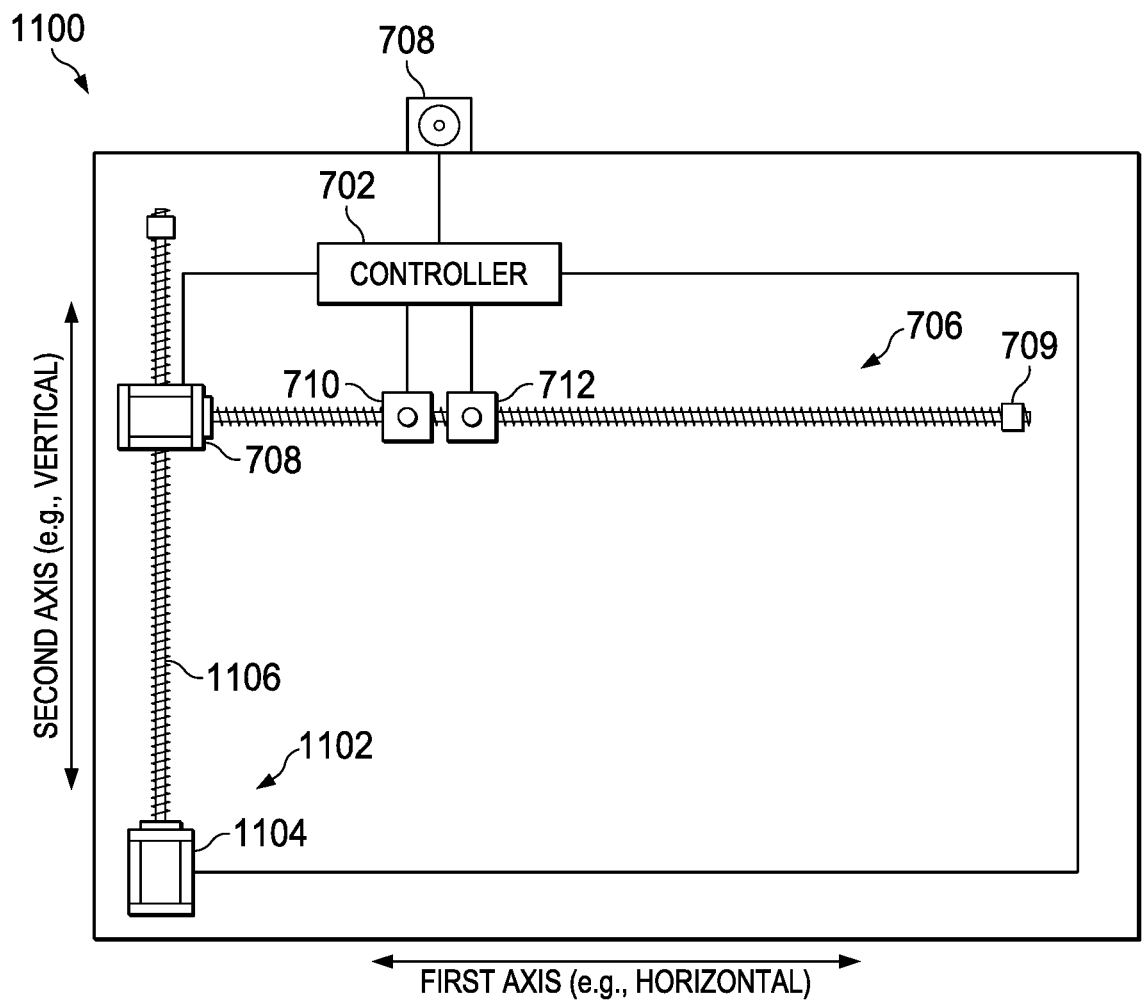
FIG. 10 illustrates an example of the additional system in which an additional actuator is included to drive projectors in two dimensions.

Referring to FIG. 10, an example 1100 of the system 700 configured to drive projectors along two axes is shown. In the example 1100, the linear actuator 706 is mounted to a second linear actuator 1102. In the illustrated example, the second linear actuator 1102 includes a second motor 1104 and a second screw 1106 though other forms of linear actuators may be used. The linear actuator 706 is configured to drive the projectors 710, 712 along a first axis (e.g., a horizontal axis) while the second linear actuator 1102 is configured to drive the linear actuator 706 along a second axis (e.g., a vertical axis). Accordingly, the linear actuators 706, 1102 are configured to drive the projectors 710, 712 in two dimensions. The controller 702 is configured to activate the linear actuators 706, 1102 to drive the projectors 710, 712 to positions associated with projecting to locations of a user's eyes as described above.

Figure 11:
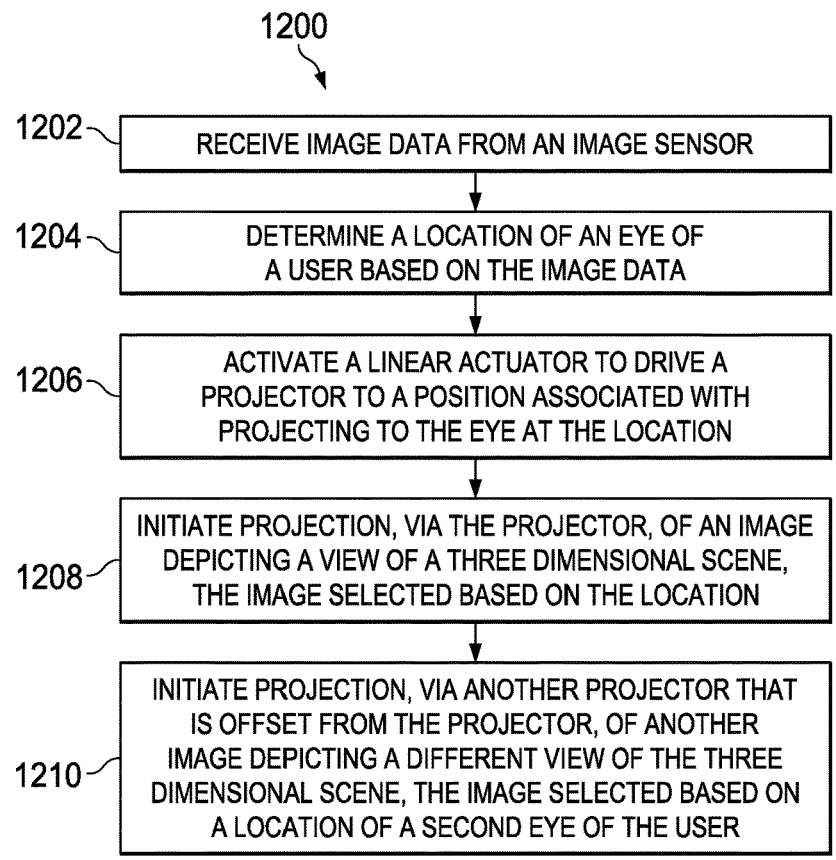
FIG. 11 is a flowchart of another method for increasing angular resolution in an autostereoscopic multiview display.

Referring to FIG. 11, another method 1200 for increasing angular resolution in an autostereoscopic multiview display based on user eye detection is shown. The method 1200 may be performed by the system 700. The method 1200 includes receiving image data from an image sensor, at 1202. For example, the controller 702 may receive image data from the image sensor 716.

The method 1200 further includes determining a location of an eye of a user based on the image data, at 1204. For example, based on the image data the controller 702 may determine a location of the first eye 718 of the user.

The method 1200 further includes activating a linear actuator to drive a projector to a position associated with projecting to the eye at the location, at 1206. For example, the controller 702 may activate the linear actuator 708 to drive the second projector 712 to a position at which light from the projector is directed to the location of the first eye 718 by the diffuser screen 714.

The method 1200 further includes initiating projection, via the projector, of an image depicting a view of a three-dimensional scene, the image selected based on the location, at 1208. For example, the controller 702 may initiate projection, via the second projector 712, of the second image 724 to the location of the first eye 718. As explained above, the second image 724 is selected by the controller 702 based on the location of the first eye 718.

The method 1200 further includes initiating projection, via another projector that is offset from the projector, of another image depicting a different view of the three dimensional scene based on a location of the a second eye of the user, at 1210. For example, the controller 702 may initiate projection, via the first projector 710, of the first image 722 to the location of the second eye 720. As explained above, the first image 722 is selected by the controller 702 based on the location of the second eye 720. By initiating projection of different images depicting different views of a scene to the eyes 718, 720, the controller 702 can create a stereoscopic effect.

The method 1200 may provide increased angular resolution as compared to other systems because the method 1200 determines what view of a three-dimensional scene a projector projects based on a location of a user's eye rather than causing the projector to project a fixed view. Further, because the method 1200 causes the projector to be moved to a position associated with projecting to the location of the eye, the method 1200 may use fewer projectors as compared to methods that rely on fixed arrays of projectors. Further, moving projectors allows the method to direct images to a user's eyes without the use of a diffuser screen. Accordingly, a depth of focus of a display implementing the method 1200 may be longer as compared to other displays and images will remain in focus at a variety of vergence points.

Figure 12:
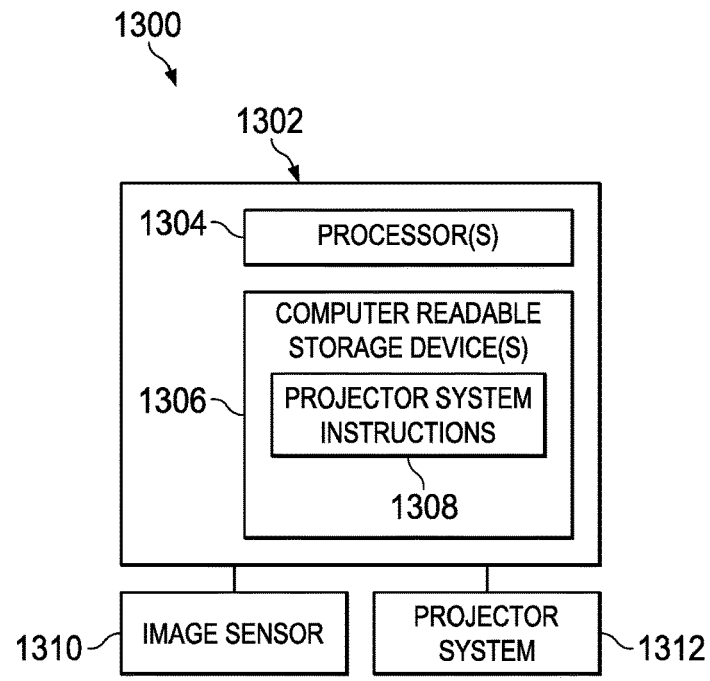
FIG. 12 is a block diagram of a computer system that may perform the functions described herein.

Referring to FIG. 12, a block diagram of a computer system 1300 that may provide increased angular resolution in an autostereoscopic multiview display is shown. The computer system 1300 includes a computing device 1302. The computing device 1302 may correspond to the controller 102 or to the controller 702. The computing device includes one or more processors 1304 and one or more computer readable storage devices 1306. The one or more processors 1304 may include one or more CPUs, one or more GPUs, one or more other processors, or a combination thereof. The one or more computer readable storage devices 1306 may include one or more read only memory (ROM) devices, one or more random access memory (RAM) devices, one or more disc drive devices, one or more other types of memory devices, or a combination thereof. The one or more computer readable storage devices 1306 store projector system instructions 1308 that are executable by the one or more processors 1304 to perform one or more of the functions described herein.

The computer system 1300 further includes an image sensor 1310. The image sensor 1310 corresponds to a camera or to another type of imaging device. For example, the image sensor 1310 may correspond to the image sensor 106 or to the image sensor 716. The computer system 1300 further includes a projector system 1312. The projector system 1312 includes one or more projectors, one or more actuators, or a combination thereof. For example, the projector system 1312 may correspond to the projector array 104, the projectors 710, 712, the actuator 706, the projectors 920, 922, 924, 926, the second actuator 1102 or a combination thereof.

The one or more processors 1304 executing the instructions 1308 are configured to perform the operations described herein. For example, the one or more processors 1304 may receive image data from the image sensor 1310 and determine a location of a user's eye. Based on the location, the one or more processors 1304 select one or more images to the eye and controls the projector system 1312 accordingly. Further, the one or more processors 1304 may control one or more actuators of the projector system 1312 to drive one or more projectors into positions associated with projecting to the location of the user's eye.

It should be noted that the described systems and methods, and examples thereof, may be combined in their entirety or in part. To illustrate, the example 900 of the system 700 may include the second linear actuator 1102.

In this description, the term "couple" or "couples" means either an indirect or direct wired or wireless connection. Thus, if a first device couples to a second device, that connection may be through a direct connection or through an indirect connection via other devices and connections. Further, devices illustrated as directly coupled may be indirectly coupled in some implementations. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. An apparatus comprising:
an image sensor configured to provide image data;
a first projector at a first position;
a second projector at a second position;
a third projector at a third position;
an actuator coupled to the first projector, to the second projector, and to the third projector;
a controller coupled to the image sensor, to the actuator, to the first projector, to the second projector, and to the third projector, the controller configured to:
receive the image data from the image sensor;
based on the image data, determine a pupil location;
based on the pupil location, instruct the actuator to adjust at least one of the first position, the second position, or the third position, to align the first projector with a first pupil portion, to align the second projector with a second pupil portion, and to align the third projector with a third pupil portion; and
based on the pupil location:
instruct the first projector to project a first view of the three-dimensional scene;
instruct the second projector to project a second view of the three-dimensional scene; and
instruct the third projector to project a third view of the three-dimensional scene.

2. The apparatus of claim 1, wherein the controller is configured to select the first, second and third views based on the pupil location.

3. The apparatus of claim 1, wherein the controller is configured to:
based on the image data, determine the pupil location by determining a pupil movement; and
based on the pupil movement, control the actuator.

4. The apparatus of claim 2, wherein the controller is configured to select the first, second and third views to induce a motion parallax effect.

5. The apparatus of claim 2, further comprising a fourth projector at a fourth position, the fourth projector coupled to the actuator and to the controller, the pupil location is a first pupil location, and the controller is further configured to:
based on the image data, determine a second pupil location;
based on the second pupil location, instruct the actuator to adjust the fourth position; and
based on the second pupil location, select a fourth view of the three-dimensional scene, and instruct the fourth projector to project the fourth view.

6. The apparatus of claim 1, further comprising a screen assembly having viewing areas, in which the screen assembly is configured to direct the first view from the first projector to a particular one of the viewing areas.

7. The apparatus of claim 6, wherein the controller is configured to:
determine whether the pupil location is sufficient for the pupil to view the particular one of the viewing areas; and
based on that determination, instruct the actuator to adjust the first position, so the screen assembly directs the first view from the first projector to the particular one of the viewing areas.

8. The apparatus of claim 6, wherein the screen assembly includes a Fresnel lens, a diffuser screen, a holographic optical element, or a combination thereof.

9. The apparatus of claim 1, wherein the actuator includes first and second linear actuators, the first linear actuator is configured to adjust the first position along a first axis, and the second linear actuator is configured to adjust the first position along a second axis, the second axis perpendicular to the first axis.

10. The apparatus of claim 1, wherein the actuator includes a motor and a screw.

11. The apparatus of claim 1, wherein the first projector is configured to project the first view to a viewing window having a width between 0.67 millimeters and 2.67 millimeters.

12. A method comprising:
receiving, by a controller, image data from an image sensor;
determining, by the controller, an eye location based on the image data;
instructing, by a controller, an actuator to drive a first projector to a position based on the eye location;
instructing, by the controller the first projector, at the position, to project a first image depicting a first view of a three-dimensional scene, based on the eye location, the first image selected based on the eye location;
instructing, by the controller, a second projector to project a second image depicting a second view of the three-dimensional scene, based on the eye location; and
instructing, by the controller, a third projector to project a third image depicting a third view of the three-dimensional scene, based on the eye location.

13. The method of claim 12, further comprising:
initiating movement of the actuator to drive the first projector to a second position associated with a second eye location in response to detecting eye movement; and
initiating projection, via the first projector, of a fourth image depicting a fourth view of the three-dimensional scene.

14. A non-transitory computer readable storage medium storing instructions executable by one or more processors to:
receive image data from an image sensor;
determine an eye location based on the image data;
instruct an actuator to drive a first projector to a position associated with the eye location;
instruct the first projector to project a first image depicting a first view of a three-dimensional scene based on the eye location, the first image selected based on the eye location;
instruct a second projector to project a second image depicting a second view of the three-dimensional scene based on the eye location; and
instruct a third projector to project a third image depicting a third view of the three-dimensional scene based on the eye location.

15. The non-transitory computer readable storage medium of claim 14, wherein the instructions are further executable by the one or more processors to:
initiate movement of the actuator to drive the first projector to a second position associated with a second eye location in response to detecting eye movement; and
initiate projection, via the first projector, of a fourth image depicting a fourth view of the three-dimensional scene.

* * * * *